April 3, 1956 J. G. LEE 2,740,596
VORTEX GENERATOR
Filed Aug. 19, 1953

INVENTOR
JOHN G. LEE
BY Leonard F. Weltlich
ATTORNEY

United States Patent Office 2,740,596
Patented Apr. 3, 1956

2,740,596

VORTEX GENERATOR

John G. Lee, Farmington, Conn., assignor to United Aircraft Corporation, East Hartford, Conn., a corporation of Delaware Application August 19, 1953, Serial No. 375,182

7 Claims. (Cl. 244—40)

This invention relates to boundary layer control mechanisms and more particularly to vortex generating type of boundary layer energizing mechanisms.

As described in Patent No. 2,558,816, the boundary layer flow over a fluid confining surface can be energized by use of small vortex generating fins which protrude from the surface and terminate adjacent the imaginary surface separating the boundary layer and mainstream flows. The vortex produced at the tips of the fins intermix a portion of the high energy mainstream with the low energy boundary layer so that the boundary layer region is increased in energy thus preventing flow separation or other undesirable flow conditions.

It is customary to have the fins located with their chordwise dimensions at an angle of attack relative to the axis of mainstream flow so that tip vortices are produced which trail downstream thereof. However, where local changes in the relative direction of the airstream occur the vortex producing fins may be operating at a stalled or negative angle of attack so that proper vortices are no longer produced and the effectiveness of the boundary layer control is greatly reduced.

Such a change in relative direction of the fluid flow occurs for example on swept back wings of aircraft. For example, on highly swept wings the boundary layer tends to flow along the wing span in an outward direction on the upper surface. At some point near the wing tip this boundary layer bends aft so that the boundary layer flow eventually spreads in an aft direction over a portion of the wing tip and is eventually shed from the wing. The exact direction of this flow at any given point is hard to determine in advance and is apt to change with the angle of incidence of the wing.

It therefore becomes apparent that since the boundary layer flow may have an unknown or varying spanwise component of flow, any vortex generating fins that are fixed to the upper wing surface may be operating at a stalled or negative angle of attack so that proper vortex generation for boundary layer energization may not be affected. Other local variations of fluid flow would similarly affect the operation of the vortex generators.

It is therefore an object of this invention to provide a vortex generator for boundary layer control which will continue to produce strong tip vortices regardless of local changes in relative direction of the fluid flow.

These and other objects will become readily apparent from the following detail description of the drawing in which.

Figure 1:
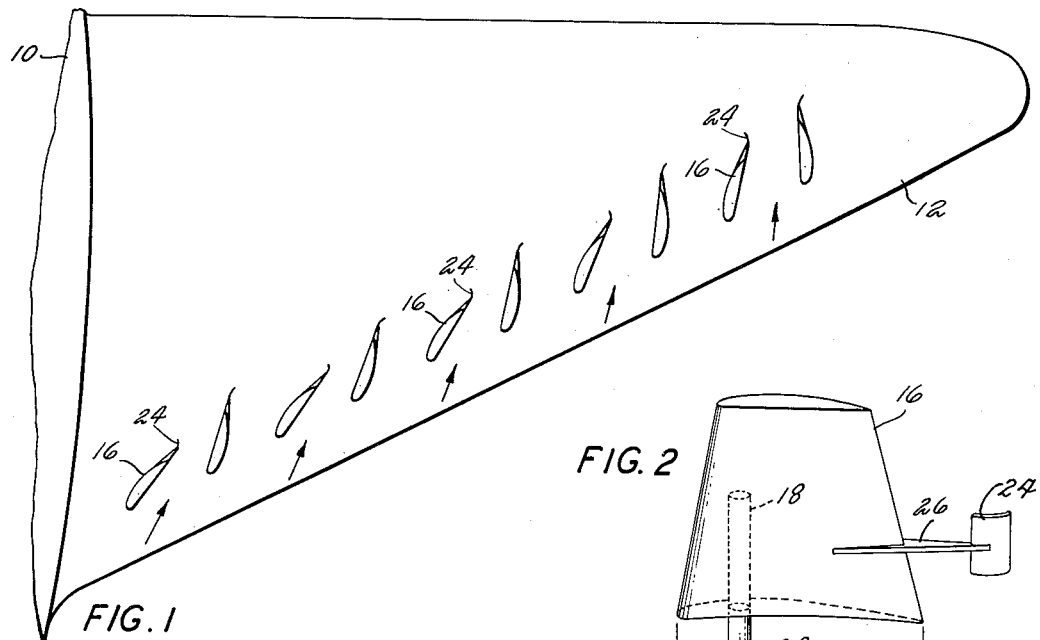
Fig. 1 is a plan view of a swept wing having the vortex generators of this invention mounted thereon.
Figure 2:
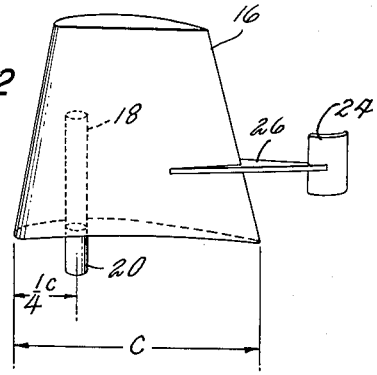
Fig. 2 is a perspective view of a typical vortex generator.
Figure 3:
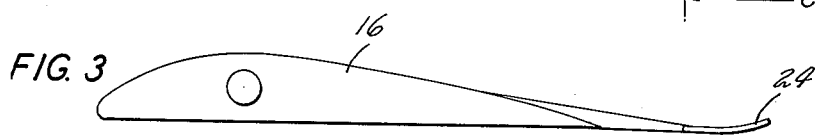
Fig. 3 is an enlarged end view looking at the inboard end of the vortex generator shown in Fig. 2.

Fig. 1 illustrates a portion of a fuselage 10 having a swept back wing 12 which has mounted on its upper surface a plurality of vortex generators 16. A vortex generator 16 is better illustrated in Fig. 2. The vortex generator or fin 16 is provided with a spanwise passage 18 in which is fitted a shaft 20 which in turn is mounted in a suitable bearing in the wing 12. Thus, each of the fins 16 are freely pivoted on the upper surface of the wing 12 so that they can rotate about the axis of the shaft 20. As shown in Fig. 2, the fins 16 are pivoted approximately at the one-fourth chord position of the fin. In order to insure that the vortex generators or fins 16 will remain at some predetermined angle of attack relative to the local direction of the fluid stream, a flexible or adjustable tab 24 is provided. This tab acts as a deflector which will rotate the fins 16 about the axis of shaft 20 in much the same manner as the tail of an airplane determines the angle which the airplane's wing maintains with respect to the airstream. In order to utilize a small tab while still producing a sufficiently high turning force an extension member 26 extends aft from the trailing edge of the fin 16 and the tab is mounted on the downstream end thereof so as to increase the moment arm of the force being produced by the deflector tab 24. Fig. 3 illustrates an end view of the fin shown in Fig. 2.

Figure 4:
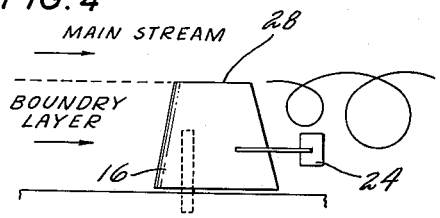
Fig. 4 is similar to Fig. 2 but illustrates the vortices produced by the vortex generators.

As illustrated in Fig. 4, the fin 16, when at a predetermined angle of attack relative to the local flow direction, will produce a trailing tip vortex which travels downstream thereof. The fin 16 terminates in a tip 28 which is located approximately adjacent the imaginary surface which separates the boundary layer and mainstream flows. As a result the trailing vortex interchanges a portion of the high energy of the mainstream with a portion of the low energy boundary layer so that downstream of the fin 16 the boundary layer will have a substantially high energy.

As shown in Fig. 1, each adjacent vortex producing fin 16 has its tab 24 bent oppositely so that the fins 16 assume opposite angles of attack thereby producing adjacent counterrotating vortices therefrom. As a result, regardless of local changes of direction of the fluid stream, the fins 16 will continue to generate tip vortices thereby insuring continued boundary layer energization during varying flow conditions. The local boundary layer flow over the wing is schematically shown by arrows in Fig. 1. The attitude of the fins 16 is shown somewhat exaggerated at points along the wing span for better clarity.

Figure 5:
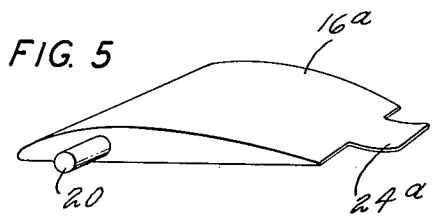
Fig. 5 is a modified form of vortex generator.

Fig. 5 illustrates a modified type of vortex generating fin 16a which has its adjustable tab 24a mounted right at the trailing edge of the fin rather than on an extension member such as illustrated in Fig. 2. The fins 16a of Fig. 5 may be utilized where the force generated by the tab 24a would be sufficient to maintain the proper angle of attack.

As a result of this invention it is apparent that a simple but highly effective improved vortex generator has been provided which will produce effective boundary layer control under varied airflow conditions.

Although only certain embodiments of this invention have been illustrated and described herein, it will be apparent that various changes and modifications may be made in the construction and arrangement of the various parts without departing from the scope of this novel concept.

What it is desired to obtain by Letters Patent is:

1. In combination, a fluid contact surface over which a main fluid stream flows, means for mixing boundary layer flow immediately adjacent said surface whereby a portion of the energy of the main fluid stream is utilized to energize the boundary layer, said means including at least one vortex generating fin pivotally mounted on said surface and terminating in a tip approximately adjacent the imaginary surface separating the boundary layer and mainstream flows, the axis of pivotation of said fin running spanwise thereof, and means for insuring continued vortex generation during relative changes of the direction of fluid flow comprising deflector means carried by said fin at a point spaced downstream from said axis for maintaining said fin at a predetermined angle of attack relative to the fluid stream.

2. In a combination according to claim 1 wherein the axis of pivotation of said fin is located upstream of the mid-chord position of said fin.

3. In a combination according to claim 1 wherein said deflector means includes a tab.

4. In a combination according to claim 1 wherein said deflector means includes an extension member carried by said fin and terminating in a tab located aft of the trailing edge of said fin.

5. In combination, a fluid contact surface over which a main fluid stream flows, means for mixing boundary layer flow immediately adjacent said surface whereby a portion of the energy of the main fluid stream is utilized to energize said boundary layer, said means including a plurality of vortex generators carried by said surface and projecting toward the mainstream to a point approximately adjacent the imaginary surface separating the boundary layer and mainstream flows, the vortices produced trailing downstream from each of said generators, and means for maintaining said generators at an angle of attack relative to the axis of fluid flow during variations in direction of said flow comprising mechanism for freely pivoting said generators on said surface and deflector means carried by said generators and spaced downstream of said pivoting mechanism.

6. In combination, a fluid contact surface over which a main fluid stream flows, means for mixing boundary layer flow immediately adjacent said surface whereby a portion of the energy of the main fluid stream is utilized to energize said boundary layer, said means including a plurality of fins of airfoil shape carried on said surface and terminating in free tips approximately adjacent the imaginary surface separating the boundary layer and mainstream flows, said fins being spaced transversely of the axis of mainstream flow, and means for maintaining said fins at an angle of attack relative to the axis of fluid flow to insure the generation of vortices from the tips thereof during variations in direction of the relative flow of said fluid comprising means for freely pivoting said fins on said surface, and deflector means carried by said fins and spaced downstream of said pivoting means, the deflector means on adjacent fins being arranged to deflect said fins in relative opposite directions so that the tips of said fins generate adjacent oppositely rotating vortices.

7. In combination with an aircraft wing having a swept back configuration over which a main fluid stream flows, said wing having upper and lower major surfaces, means for mixing boundary layer flow immediately adjacent the upper surface of said wing whereby a portion of the energy of the main fluid stream is utilized to energize said boundary layer, said means including a plurality of fins of airfoil shape freely pivotally mounted on said upper surface on axes running spanwise of said fins, said fins being spaced along the span of said wing, and means for maintaining said fins at a predetermined angle of attack relative to the axis of fluid flow regardless of variations of the direction of said flow comprising a tab mounted adjacent the trailing edge of each fin.

References Cited in the file of this patent

UNITED STATES PATENTS

| | | |
|---|---|---|
| 1,334,707 | Martin | Mar. 23, 1920 |
| 1,574,567 | Flettner | Feb. 23, 1926 |
| 1,600,671 | Hill | Sept. 21, 1926 |
| 1,879,618 | Icre | Sept. 27, 1932 |
| 1,893,065 | Zaparka | Jan. 3, 1933 |
| 2,390,939 | Huff | Dec. 11, 1945 |
| 2,558,816 | Bruynes | July 3, 1951 |
| 2,650,752 | Hoadley | Sept. 1, 1953 |
| 2,656,132 | Howard | Oct. 20, 1953 |
| 2,690,315 | Todoroff | Sept. 28, 1954 |